United States Patent
Stählin

(10) Patent No.: US 9,211,911 B2
(45) Date of Patent: Dec. 15, 2015

(54) METHOD FOR STEERING ASSISTANCE DURING AN EMERGENCY MANEUVER

(75) Inventor: Ulrich Stählin, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 256 days.

(21) Appl. No.: 13/062,105

(22) PCT Filed: Sep. 7, 2009

(86) PCT No.: PCT/DE2009/001246
§ 371 (c)(1),
(2), (4) Date: Apr. 27, 2011

(87) PCT Pub. No.: WO2010/028629
PCT Pub. Date: Mar. 18, 2010

(65) Prior Publication Data
US 2011/0196576 A1 Aug. 11, 2011

(30) Foreign Application Priority Data
Sep. 10, 2008 (DE) .......................... 10 2008 041 981

(51) Int. Cl.
*B62D 6/00* (2006.01)
*B62D 15/02* (2006.01)

(52) U.S. Cl.
CPC ............ *B62D 15/0265* (2013.01); *B62D 6/003* (2013.01); *B62D 15/025* (2013.01)

(58) Field of Classification Search
CPC .. B62D 6/003; B62D 15/0265; B62D 15/025; B62D 6/00
USPC ..................................... 701/301, 41; 180/167
See application file for complete search history.

(56) References Cited

U.S. PATENT DOCUMENTS

| 4,961,476 A | * | 10/1990 | Witte | ................. | B60K 23/0808 180/197 |
| 5,699,040 A | * | 12/1997 | Matsuda | ................ | B60Q 9/008 180/169 |
| 5,857,532 A | * | 1/1999 | Satzler | ................. | B62D 11/183 180/6.2 |

(Continued)

FOREIGN PATENT DOCUMENTS

| DE | 102004008894 A1 | 9/2005 |
| DE | 102004059002 A1 | 6/2006 |

(Continued)

*Primary Examiner* — John R Olszewski
*Assistant Examiner* — Jean-Paul Cass
(74) *Attorney, Agent, or Firm* — RatnerPrestia

(57) ABSTRACT

A method for steering assistance of a motor vehicle driver of a motor vehicle in dangerous situations. The vehicle is equipped with a mechanism which influences its steering device and a vehicle environment detection mechanism. A trajectory calculation unit calculates driving cases of all drivable and stable movement trajectories on the basis of the data of the vehicle environment detection mechanism. A mechanism detects and evaluates a current steering wheel actuation with regard to the presence of a dangerous situation, wherein, when a dangerous situation is detected, the movement trajectory from the currently determined driving case is determined which corresponds to the driving maneuver that is indicated by the associated current steering wheel actuation, and the driver is assisted, by way of the mechanism which influences the steering device, in continuing the driving maneuver as a function of the determined movement trajectory.

12 Claims, 1 Drawing Sheet

(56) References Cited

U.S. PATENT DOCUMENTS

| | | | | |
|---|---|---|---|---|
| 6,035,053 | A * | 3/2000 | Yoshioka | B60K 31/0008 340/435 |
| 6,084,508 | A * | 7/2000 | Mai | B60T 7/22 340/435 |
| 6,275,773 | B1 * | 8/2001 | Lemelson | G01S 19/11 340/436 |
| 6,338,022 | B1 * | 1/2002 | Shinmura | B62D 15/0265 701/301 |
| 6,353,788 | B1 * | 3/2002 | Baker | B60K 31/0008 340/435 |
| 6,359,553 | B1 * | 3/2002 | Kopischke | B60Q 9/008 180/169 |
| 6,838,846 | B2 * | 1/2005 | Matsuoka | B62D 5/0466 180/443 |
| 6,876,911 | B2 * | 4/2005 | Chen | B62D 5/0463 180/400 |
| 7,016,783 | B2 * | 3/2006 | Hac | B60K 31/0008 180/167 |
| 7,089,101 | B2 * | 8/2006 | Fischer | B60K 31/0008 180/413 |
| 7,395,142 | B2 * | 7/2008 | Mori | B60K 28/14 180/443 |
| 7,433,768 | B2 * | 10/2008 | Bernzen | B62D 6/008 477/1 |
| 7,481,294 | B2 * | 1/2009 | Fujita | B62D 15/0245 180/446 |
| 7,660,668 | B2 * | 2/2010 | Lucas | G01S 13/931 340/436 |
| 7,684,911 | B2 * | 3/2010 | Seifert | B60G 17/06 280/5.5 |
| 7,706,941 | B2 * | 4/2010 | Majersik | B60G 17/0162 280/5.5 |
| 7,747,359 | B2 * | 6/2010 | Katrak | G05D 1/0891 180/204 |
| 7,937,200 | B2 * | 5/2011 | Shimizu | B62D 5/0469 180/446 |
| 8,086,406 | B2 * | 12/2011 | Ewerhart | B60T 7/22 342/147 |
| 8,180,525 | B2 * | 5/2012 | Luke | B60C 23/061 701/25 |
| 8,190,364 | B2 * | 5/2012 | Rekow | A01B 69/006 701/302 |
| 8,209,090 | B2 * | 6/2012 | Arbitmann | B60W 10/06 701/300 |
| 8,340,883 | B2 * | 12/2012 | Arbitmann | B60W 10/06 235/439 |
| 2002/0026270 | A1 * | 2/2002 | Kurishige | B62D 15/0245 701/41 |
| 2002/0156581 | A1 * | 10/2002 | Matsuura | B62D 7/159 701/301 |
| 2004/0030498 | A1 * | 2/2004 | Knoop | B60T 7/22 701/301 |
| 2004/0153228 | A1 * | 8/2004 | Matsumoto | B60T 8/17552 701/41 |
| 2004/0158377 | A1 * | 8/2004 | Matsumoto | B60T 8/17557 701/48 |
| 2004/0193374 | A1 * | 9/2004 | Hac | B60K 31/0008 701/301 |
| 2004/0215393 | A1 * | 10/2004 | Matsumoto | B60T 8/17557 701/300 |
| 2004/0230375 | A1 * | 11/2004 | Matsumoto | B60T 8/17557 701/301 |
| 2005/0113999 | A1 * | 5/2005 | Tange | B60T 8/17557 701/41 |
| 2005/0182548 | A1 * | 8/2005 | Bernzen | B60G 17/0195 701/70 |
| 2005/0257987 | A1 * | 11/2005 | Bohm | B62D 5/0472 180/419 |
| 2006/0025893 | A1 * | 2/2006 | Fischer | B60K 31/0008 701/1 |
| 2006/0155455 | A1 * | 7/2006 | Lucas | G01S 13/931 701/70 |
| 2006/0163943 | A1 * | 7/2006 | Von Holt | B60K 31/0008 303/177 |
| 2007/0225884 | A1 * | 9/2007 | Klier | B62D 6/003 701/41 |
| 2007/0239333 | A1 * | 10/2007 | Galkowski | B62D 15/025 701/41 |
| 2007/0294008 | A1 * | 12/2007 | Yasui | B62D 5/0472 701/41 |
| 2007/0299610 | A1 * | 12/2007 | Ewerhart | B60T 7/22 701/301 |
| 2008/0208408 | A1 * | 8/2008 | Arbitmann | B60W 10/06 701/41 |
| 2009/0076702 | A1 * | 3/2009 | Arbitmann | B60W 10/06 701/96 |
| 2010/0228438 | A1 * | 9/2010 | Buerkle | B62D 15/025 701/41 |
| 2010/0292888 | A1 * | 11/2010 | Taguchi | B60W 10/06 701/31.4 |
| 2010/0292904 | A1 * | 11/2010 | Taguchi | B60W 30/143 701/93 |
| 2010/0299028 | A1 * | 11/2010 | Savaresi | B62K 21/08 701/42 |

FOREIGN PATENT DOCUMENTS

| WO | WO2005080133 | * | 9/2005 |
| WO | WO 2008/031662 A1 | | 3/2008 |

* cited by examiner

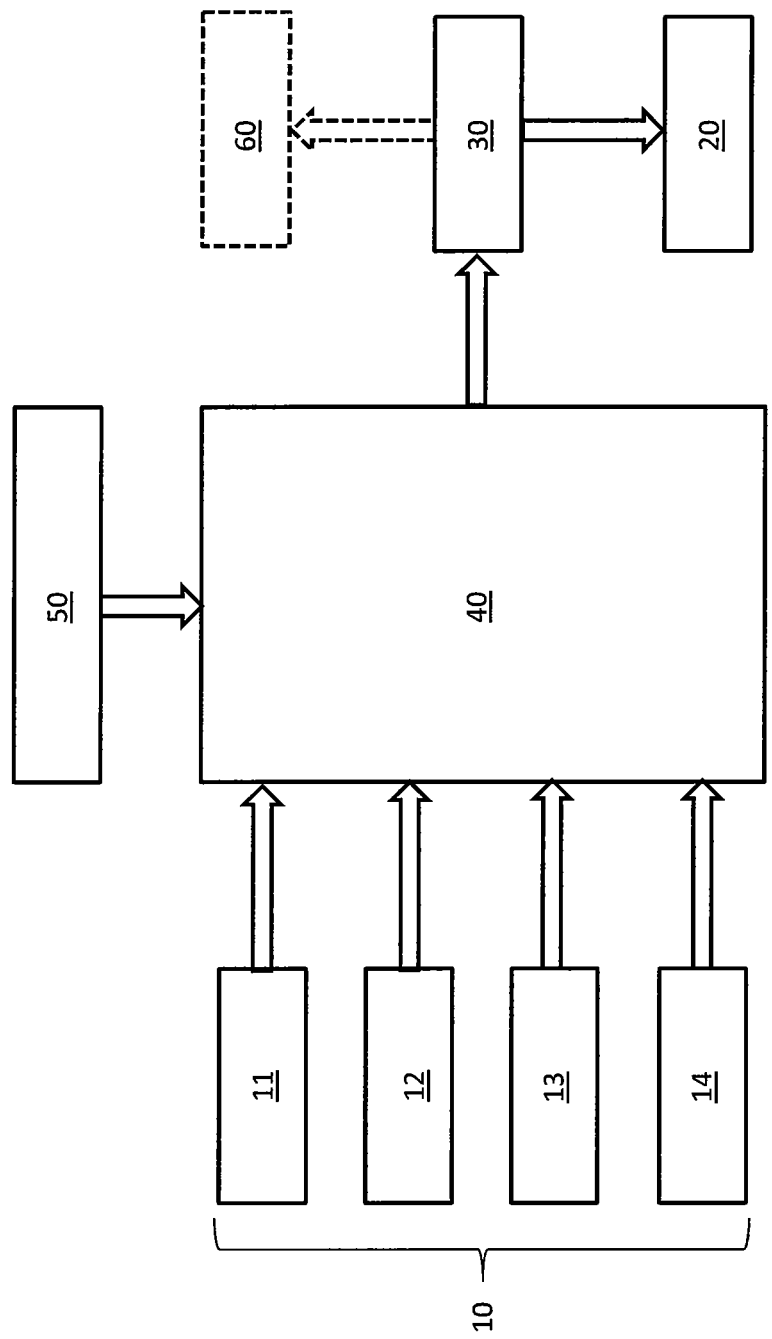

METHOD FOR STEERING ASSISTANCE DURING AN EMERGENCY MANEUVER

CROSS REFERENCE TO RELATED APPLICATIONS

This application is the U.S. national phase application of PCT International Application No. PCT/DE2009/001246, filed Sep. 7, 2009, which claims priority to German Patent Application No. 10 2008 041 981.8, filed Sep. 10, 2008, the contents of such applications being incorporated by reference herein.

FIELD OF THE INVENTION

The invention relates to a method for steering assistance in dangerous situations.

BACKGROUND OF THE INVENTION

Such a method is known from DE 10 2004 008 894 A1, which is incorporated by reference, where, by means of a calculated optimum avoidance trajectory in the form of an applied steering torque or in the form of an additional steering angle applied to a superimposed steering of a vehicle, an avoidance maneuver initiated by the driver is assisted so as to be able to thus possibly prevent an accident due to collision or skidding. An obstacle and its dimensions and the distances from the obstacle are detected using environment detection sensors, for example by means of radar and/or video sensors. If there is a risk of collision with an obstacle, an avoidance trajectory is calculated and held available for an avoidance maneuver, for example for swerving to the left as well as for swerving to the right, which avoidance trajectory is optimal for the existing situation and which enables safely passing by the obstacle while taking into account the driving stability.

Furthermore, within the framework of a publicly funded German research initiative of German enterprises, a continuous, integrated lateral guidance assistance system for lane keeping, lane changing, and for driving through narrow construction sites is being developed in a four-year research program until mid-2010, among other things in an "Integrated lateral guidance" subproject of an Active Safety project. The vehicle environment is detected and analyzed by several sensors and transformed into a corresponding lane guidance, wherein the steering is controlled, for example, by an electromechanical steering system in the vehicle.

The disadvantage of these known methods is that the driver notices the intervention into the steering device of his vehicle and thus the acceptance of such a method by the driver decreases or the method is even rejected altogether by the driver. It is even possible that the driver's intent is overridden by these systems, which additionally leads to a lessened acceptance.

There does exist something referred to as the Drive Steer Recommendation, where an additional torque is applied to the steering wheel if the driver is to counter-steer, for example in the case of μ-split braking. The driver has to intervene himself, however, and is not assisted by the vehicle. The steering torque serves only as an indication as to which action is necessary.

Finally, it is also known to change the steering ratio already dynamically with Active Front Steering (superimposed steering) to thus set a more indirect ratio at high speeds or a more direct ratio during the process of parking, for example.

During an avoidance maneuver, the typical cause of an accident is that the driver jerks the steering wheel around, i.e., steers too heavily and/or too hectically. Typically, the first steering action turns out very well, but counter-steering then is a problem, and if the first lane change or the first avoidance maneuver is successful, steering back will most often be a problem (see "moose test" or ISO double lane change).

SUMMARY OF THE INVENTION

An object of the invention is to provide a method of the type initially mentioned, which assists a driver during an avoidance maneuver, in particular prevents, as far as possible, skidding during an avoidance maneuver, also when steering back.

This object is achieved by a method for steering assistance of a motor vehicle driver of a motor vehicle in dangerous situations, in which method the motor vehicle is equipped with means which influence its steering device and with vehicle environment detection means, wherein a trajectory calculation unit is provided which calculates driving cases of all drivable and stable movement trajectories on the basis of the data of the vehicle environment detection means, means are provided for detecting and for evaluating a current steering wheel actuation with regard to the presence of a dangerous situation, when a dangerous situation is detected, the movement trajectory from the currently determined driving case is determined which corresponds to the driving maneuver that is indicated by the associated current steering wheel actuation, and the driver is assisted, by means of the means which influence the steering device, in continuing the driving maneuver as a function of the determined movement trajectory.

According to this, in such a method for steering assistance of a motor vehicle driver of a motor vehicle in dangerous situations, in which method the motor vehicle is equipped with means which influence its steering device and with vehicle environment detection means, a trajectory calculation unit is provided according to aspects of the invention which calculates driving cases of all drivable and stable movement trajectories on the basis of the data of the vehicle environment detection means; furthermore, means are provided for detecting and for evaluating a current steering wheel actuation with regard to the presence of a dangerous situation, wherein, when a dangerous situation is detected, the movement trajectory from the currently determined driving case is determined which corresponds to the driving maneuver that is indicated by the associated current steering wheel actuation, and the driver is assisted, by means of the means which influence the steering device, in continuing the driving maneuver as a function of the determined movement trajectory.

Preferably, in addition also the data of the vehicle environment detection means can be detected and evaluated to evaluate whether a dangerous situation is present.

By continuously calculating driving cases of stable movement trajectories the vehicle can assist the driver at any time such that he can carry out and finish his maneuver with a stable trajectory.

Preferably, the trajectory calculation unit determines the steering wheel angle associated with each calculated movement trajectory, wherein the steering wheel actuation is detected and analyzed by detecting the steering wheel angle or an angle corresponding to the steering wheel angle and/or by detecting the steering wheel angular velocity or an angular velocity speed corresponding to the steering wheel angular velocity.

The steering wheel angle is determined, for example, by means of a steering angle sensor, wherein by differentiation of the steering angle signals also the steering angular velocity can be derived. An angle corresponding to the steering wheel angle can also be derived from the wheel angle of a steerable wheel. The detection of a dangerous situation, that is, for example, a manual avoidance maneuver initiated by the driver, is done by simultaneous evaluation of the steering wheel angle and the steering wheel angular velocity, such as is known, for example, from DE 10 2004 059 002 A1, which is incorporated by reference. Here, a manual avoidance maneuver is identified whenever both quantities exceed a predetermined threshold value. The one threshold value may be a function of the other one, such that an elliptical shape is present, for example. In addition, information with regard to the environment can be incorporated into the evaluation, for example by detecting objects in the driving path of the vehicle or determining the curvature of the road or by detecting bends.

The term dangerous situation is not only understood to mean an avoidance maneuver due to a stationary or moving obstacle, but also sudden lane changes or an abrupt actuation of the steering wheel due to a bend underestimated by the driver or due to an unintentional drifting of the vehicle onto the edge of the roadway.

In a particularly advantageous further development of the invention, for the purpose of continuing the driving maneuver the current steering wheel angle, as the actual value, is compared to the steering wheel angle associated with the determined movement trajectory, as the desired value, wherein in the case of a difference between the actual and the desired value which is greater than a predefined control deviation, the current steering wheel angle is compensated by means of an additional steering angle and/or the required steering wheel angle is communicated to the driver by a counter-torque applied to the steering wheel.

Thus, it is continuously checked whether the angle set by the driver is within a predefined control deviation, which is preferably determined by the stability limit of the vehicle imposed by the physics of driving. Only when the steering wheel angle leaves the range of the physically permitted limits will the driver be assisted by the current steering wheel angle being compensated by means of an additional angle, which is generated, for example, by means of superimposed steering or rear axle steering. If the vehicle has neither superimposed steering nor rear axle steering, means are provided with which the required steering wheel angle is communicated to the driver by a counter-torque applied to the steering wheel, such that the driver does not turn the steering wheel beyond the permitted value, the steering angle thus remaining within the physically allowable range.

The driver is assisted only when there is a danger of the vehicle losing its stability determined by the physics of driving and, in such a critical situation, the intervention into the steering device will probably not be noticed by the average driver.

It is particularly advantageous if, according to a further development of the invention, during a detected avoidance maneuver of the driver an optimized avoidance trajectory is determined from the currently determined driving case for avoiding a collision, and the predefined control deviation is determined by a tolerance band around the steering wheel angle associated with the avoidance trajectory, as the desired value, wherein, in the case of a current steering wheel angle outside this tolerance band, the predefined control deviation is determined by the stability limit of the vehicle imposed by the physics of driving.

In this further development, if there is an imminent collision with an obstacle, the driver is assisted by the current steering wheel angle being adjusted by the necessary steering wheel angle, i.e., the desired value, within a narrow tolerance band. As soon as this tolerance band is left, however, the assistance is dispensed with and it is only checked whether the steering wheel angle is within the physically allowable range so as to resume the assistance if this range is left. Thus, an extremely driver-friendly behavior is achieved, where an intervention or an assistance of the driver is permitted only within narrow limits, thus substantially improving the acceptance of the system.

Preferably, the transition from the adjustment to the tolerance band to the adjustment to the stability of the vehicle determined by the physics of driving is noticeably softened even more by the adjustment of the current steering wheel angle to the tolerance band being reduced over a predetermined period of time when the current steering wheel angle leaves the tolerance band.

Additionally or alternatively, it is also possible that, when the current steering wheel angle leaves the tolerance band, the adjustment of the current steering wheel angle to the tolerance band is maintained over a predetermined period of time. Thus, for this predetermined period of time, such values of steering wheel angles are compensated, even though they are outside the tolerance band.

To be able to provide the required data for calculating the driving cases, according to a further development of the invention the vehicle environment detection means comprises environment sensors and/or an electronically stored road map, for example of a navigation system or of an electronic horizon. Preferably, a lane detection for determining the usable road width and/or an object detection of moving or stationary obstacles and/or an estimation of the roadway curvature are performed by means of the environment sensors.

Finally, according to a further development of the invention, the driving cases consist of a total of all drivable movement trajectories which are possible according to the physics of driving. Thus, the driving cases are not only calculated as curves corresponding to the courses of roads, but also as avoidance driving cases. The distinction as to whether a curve or an avoidance maneuver is appropriate can be made, for example, using electronic map data of a navigation system or data of environment sensors, wherein from these data of the environment sensors also the necessary avoidance trajectory is calculated if an obstacle is detected.

BRIEF DESCRIPTION OF THE DRAWING FIGURES

FIG. 1 shows a block diagram of a device for implementing the method according to aspects of the invention for steering assistance of a driver of a motor vehicle.

DETAILED DESCRIPTION OF THE PREFERRED EMBODIMENTS

With reference to the attached FIGURE, the invention will now be described in detail by way of an exemplary embodiment. FIG. 1 shows a block diagram of a device for implementing the method according to aspects of the invention for steering assistance of a driver of a motor vehicle.

According to this device, in a vehicle environment detection means 10 first of all the environment of the motor vehicle is detected, which comprises a radar sensor 11 and/or a video sensor 12 and/or a sensor 13 for detecting additional data and information on the road being driven on, for example as part of a lane detection process for determining the usable lane width, including the position of the driver's own vehicle and the position of a stationary or moving obstacle, and/or a digital map 14, for example of a navigation system.

These data and this information of the vehicle environment detection means 10 are merged in a motor vehicle controller 40, and from this, driving cases of stable movement trajectories and their associated steering wheel angles are calculated at successive points in time $t_n$.

Driving cases are the total of the movement trajectories drivable due to physical reasons. Ideally, the driving cases are calculated not only as curves, but also as avoidance driving cases, i.e., the total of all avoidance maneuvers which are physically possible. The distinction as to whether, at a specific time, a curve or an avoidance maneuver is appropriate will be made based on the map data of the digital map 14 or the information of the environment sensors 11, 12, and 13. If also stationary or moving obstacles are detected with this information, ideally also the necessary avoidance trajectory is calculated in addition to the avoidance driving cases.

With a steering angle sensor unit 50, the steering wheel angle is continuously detected and also fed to the controller 40, which therefrom derives the associated steering angular velocity if this is not also provided by the steering angle sensor unit 50. These two quantities are referred to for evaluating whether a dangerous situation or an emergency maneuver, for example an avoidance maneuver by the driver, is being carried out. For this purpose, the steering wheel angle and the steering angular velocity are compared with threshold values, and then a dangerous situation or an emergency maneuver is detected if these threshold values are exceeded. In addition, the information of the vehicle environment detection means 10 can be taken into account for this detection.

If, at the point in time $t_n$, an emergency maneuver is detected in the described manner, the vehicle assists the driver in carrying out this initiated maneuver with a stable movement trajectory by first determining the movement trajectory from the driving case determined at the point in time $t_n$ which corresponds to the driving maneuver indicated by the associated current steering wheel actuation. Then, by means of a steering actuator 30 for continuing the driving maneuver as a function of the determined movement trajectory, which steering actuator influences the steering device, in this case a superimposed steering 20 and/or a rear axle steering 60, the driver is assisted in that the controller 40 checks, based on a continuous comparison between the desired and the actual value, the current steering angle being the actual value and the steering wheel angle associated with the determined movement trajectory being the desired value, whether a difference between the actual and the desired value is greater than a predefined control deviation, wherein the control deviation is determined by the stability limit of the vehicle imposed by the physics of driving. On the basis of the information of the driving vehicle detection means 10, the movement trajectory is determined instantaneously from the driving cases which are continuously generated at the points in time $t_{n+1}$, $t_{n+2}$, etc., including the associated steering wheel angles. That is, it is permanently checked whether the steering wheel angle set by the driver is still within the physically allowable limits of the steering wheel angle, which limits are derived from the movement trajectories of the continuously generated driving cases. If this is not the case, the steering wheel angle of the driver is compensated by the superimposed steering 20 and/or the rear axle steering 60 by means of an additional angle, such that the steering wheel angle remains within the physical limits.

If neither a superimposed steering 20 nor a rear axle steering 60 is available, means are present which apply a countertorque to the steering wheel, whereby the required steering wheel angle is communicated to the driver and thus the steering wheel cannot turn beyond the permitted value.

If, via the vehicle environment detection means 10, an obstacle is detected and if thus the information on the ideal course of the movement trajectory of the avoidance maneuver which has been started and the associated steering wheel angle is available, an adjustment is made to this movement trajectory, as long as the driver sets a steering wheel angle which remains within a tolerance band around the steering wheel angle necessary for this. For this purpose, the steering wheel angle set by the driver and detected via the steering wheel sensor unit 50 as the actual value is compared in the controller 40 with the steering wheel angle associated with the movement trajectory as the desired value. The movement trajectory is the avoidance trajectory for driving around the detected obstacle. If, for example, a steering wheel angle of 45° is necessary, but the driver steers with a steering wheel angle of 52°, the remainder is compensated by the superimposed steering 20 and/or the rear wheel steering 60 by means of the steering actuator 30, such that the ideal steering wheel angle of 45° is obtained. If the steering wheel angle is outside the tolerance band, it is only checked, in the manner described above, that it is within the allowed physical limits. If the steering wheel angle leaves this range, the driver is assisted again by an additional steering angle being applied to the current steering wheel angle by means of the superimposed steering 20 and/or the rear axle steering 60 for compensation.

In the case described immediately above, the tolerance range, for example, could end at 54°, which would result in a steering wheel angle of 55° no longer being compensated, but only checked as to its physical realizability. So as to not cross the boundary between the compensated and the uncompensated range too suddenly, on leaving the tolerance range the compensation is not ended abruptly, but rather reduced over a period of time T1. It is also conceivable that outliers outside the tolerance range are tolerated for a period of time T2, i.e., even such values are compensated which are normally outside the tolerance range.

The advantage of the proposed method is that the driver is assisted instead of being patronized or even being left out completely. It is to be expected that, in a dangerous situation or during an emergency maneuver such as an avoidance maneuver, the typical driver will not notice the assistance and will instead think that he has performed the maneuver entirely on his own, without any assistance from the vehicle.

For realizing the method according to aspects of the invention, no additional hardware is necessary, in particular not in modern vehicles. Instead, safety is improved while at the same time acceptance by the driver is increased.

The invention claimed is:

1. A method for steering assistance of a motor vehicle driver of a motor vehicle driver of a motor vehicle in dangerous situations, in which method the motor vehicle is equipped to detect and influence a steering device of the motor vehicle, the method comprising:
   calculating by a processor, driving cases of all drivable and stable movement trajectories on the basis of data of the vehicle environment detection means,
   detecting and evaluating, by the processor, a current steering wheel actuation with regard to the presence of a dangerous situation,
   wherein when a dangerous situation is detected by a sensor, a movement trajectory of the vehicle is determined by the processor which corresponds to a driving maneuver indicated by an associated current steering wheel actuation, wherein an actuator assisted the driver, by influencing the steering device and the current steering angle of the vehicle with a torque applied to the steering device, in continuing the driving maneuver as a function of the determined movement trajectory, wherein the processor compares the current steering wheel angle of the vehicle to an angle tolerance band around a desired steering angle associated with the movement trajectory, and wherein in response to the driver moving the current steering wheel angle from inside the tolerance band to outside the tolerance band, the processor controls the actuator to automatically:

reduce the torque applied to the steering device over a predetermined torque reducing period of time in response to determining: i) that the current steering wheel angle is outside of the tolerance band for a first amount of time that is greater than a predetermined amount of time, and ii) that excess torque is being applied to the tires, increase the torque applied to the steering device in response to determining: i) that the current steering wheel angle is outside of the tolerance band for a second amount of time that is greater than the predetermined amount of time, and ii) that insufficient torque is being applied to the tires, and maintain the torque applied to the steering device in response to determining that the current steering wheel angle is outside of the tolerance band for a third amount of time that is less than or equal to the predetermined amount of time.

2. A method according to claim 1, wherein the processor determines an associated steering wheel angle for each calculated movement trajectory, and wherein the steering wheel actuation is detected and analyzed by performing at least one of: detecting the steering wheel angle, detecting an angle corresponding to the steering wheel angle, detecting the steering wheel angular velocity, and detecting an angular velocity corresponding to the steering wheel angular velocity.

3. A method according to claim 2, wherein, for continuing the driving maneuver, the current steering wheel angle, as an actual value, is compared with the steering wheel angle associated with the determined movement trajectory, as a desired value, and wherein in the case of a difference between the actual and the desired value which is greater than a predefined control deviation, performing at least one of: compensating the current steering wheel angled by an additional steering angle, and communicating the required steering wheel angle to the driver by a counter-torque applied to the steering wheel.

4. A method according to claim 3, wherein the predefined control deviation is determined by a stability limit of the vehicle.

5. A method according to claim 3, wherein, during a detected avoidance maneuver of the driver, an optimized avoidance trajectory is determined from the currently determined driving case for avoiding a collision, wherein the predefined control deviation is determined by the tolerance band around the steering wheel angle associated with the avoidance trajectory, as the desired value, and wherein, in the case of a current steering wheel angle outside the tolerance band, the predefined control deviation is determined by a stability limit of the vehicle.

6. A method according to claim 5, wherein when the current steering wheel angle exceeds the tolerance band, adjustment of the current steering wheel angle to the tolerance band is reduced over a predetermined period of time.

7. A method according to claim 5, wherein when the current steering wheel angle exceeds the tolerance band, adjustment of the current steering wheel angle to the tolerance band is maintained over a predetermined period of time.

8. A method according to claim 1, wherein the vehicle includes at least one of environment sensors and an electronically stored road map of a navigation system.

9. A method according to claim 8, wherein a lane detection for determining a usable road width is performed by the environment sensors.

10. A method according to claim 8, wherein an object detection of at least one of: moving, and stationary obstacles is performed by the environment sensors.

11. A method according to claim 1, wherein the dangerous situation is detected by the vehicle.

12. A method according to claim 1, wherein at least one of superimposed steering, and a rear axle steering is provided.

* * * * *